US009554512B2

(12) United States Patent
Davidson et al.

(10) Patent No.: US 9,554,512 B2
(45) Date of Patent: Jan. 31, 2017

(54) ROBOTIC SYSTEMS, METHODS, AND END-EFFECTORS FOR HARVESTING PRODUCE

(71) Applicant: Washington State University, Pullman, WA (US)

(72) Inventors: Joseph Ryan Davidson, Somerville, MA (US); Changki Mo, Richland, WA (US); Qin Zhang, Richland, WA (US); Abhisesh Silwal, Prosser, WA (US); Manoj Karkee, Richland, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 14/849,729

(22) Filed: Sep. 10, 2015

(65) Prior Publication Data

US 2016/0073584 A1   Mar. 17, 2016

Related U.S. Application Data

(60) Provisional application No. 62/050,048, filed on Sep. 12, 2014.

(51) Int. Cl.
| | |
|---|---|
| A01D 46/24 | (2006.01) |
| A01D 46/30 | (2006.01) |
| B25J 9/10 | (2006.01) |
| B25J 15/00 | (2006.01) |

(52) U.S. Cl.
CPC ............... *A01D 46/30* (2013.01); *B25J 9/104* (2013.01); *B25J 15/0009* (2013.01)

(58) Field of Classification Search
CPC ...... A01D 46/24; A01D 46/30; A01D 46/005; B41J 9/04; B41J 9/46; B41J 19/021; B41J 19/023; B41J 5/007; B41J 15/10; B41J 9/104; B41J 15/0009; Y10S 56/15
USPC .............. 56/327.1, 328.1, 10.2 A, 10.2 R
See application file for complete search history.

(56) References Cited

U.S. PATENT DOCUMENTS

| | | | | | |
|---|---|---|---|---|---|
| 4,519,193 | A | * | 5/1985 | Yoshida | ................. A01D 46/24 348/89 |
| 4,663,925 | A | * | 5/1987 | Terada | ................... A01D 46/24 382/153 |
| 4,718,223 | A | * | 1/1988 | Suzuki | ................... A01D 46/30 56/328.1 |
| 2005/0126144 | A1 | * | 6/2005 | Koselka | ................. A01D 46/30 56/10.2 R |

* cited by examiner

*Primary Examiner* — Robert Pezzuto
(74) *Attorney, Agent, or Firm* — Whitham, Curtis & Cook, P.C.

(57) ABSTRACT

Robotic systems and specialized end-effectors provide for automated harvesting of produce such as fresh market apples. An underactuated design using tendons and flexure joints with passive compliance increases robustness to position error, overcoming a significant limitation of previous fruit harvesting end-effectors. Some devices use open-loop control, provide a shape-adaptive grasp, and produce contact forces similar to those used during optimal hand picking patterns. Other benefits include relatively low weight, low cost, and simplicity.

7 Claims, 11 Drawing Sheets

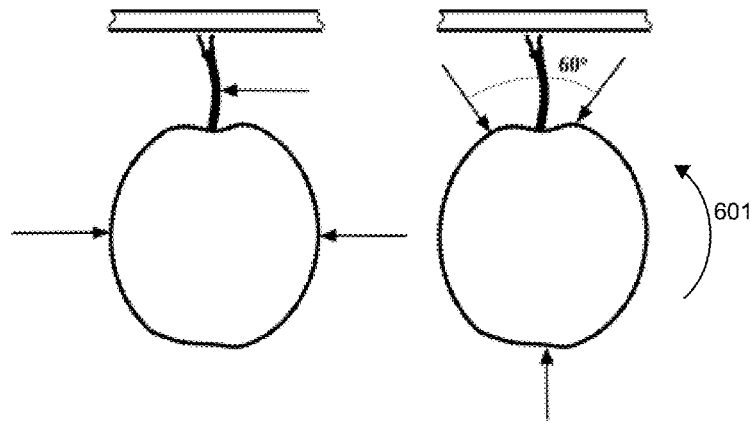
*Figure 6B*        *Figure 6A*
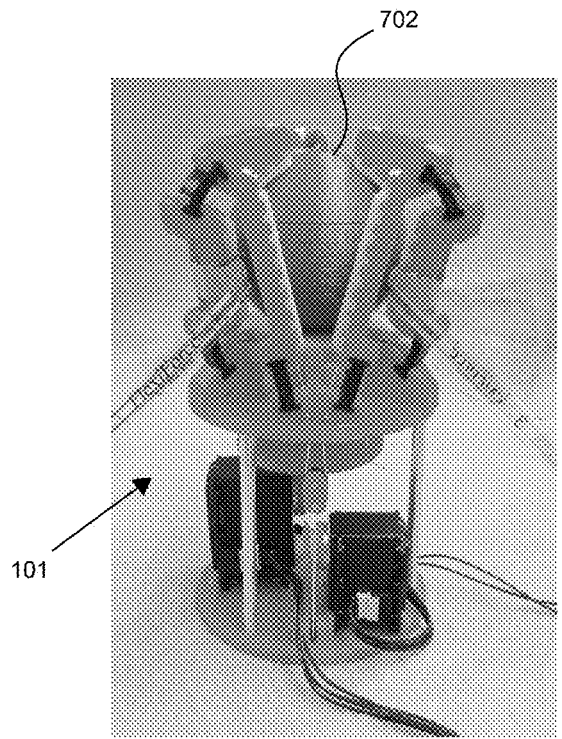
*Figure 7* ated harvesting rates (e.g. fruit/second) comparable to those obtained through manual harvesting. Additionally, the system should minimize damage to both the plant and the harvested fruit to a tolerable

ROBOTIC SYSTEMS, METHODS, AND END-EFFECTORS FOR HARVESTING PRODUCE

CROSS-REFERENCE TO RELATED APPLICATIONS

This application claims the benefit of U.S. Provisional Patent Application No. 62/050,048, filed Sep. 12, 2014, the complete contents of which are herein incorporated by reference.

STATEMENT REGARDING FEDERALLY SPONSORED RESEARCH OR DEVELOPMENT

This invention was made with government support under Contract No. 2013-67021-20942 awarded by the United States Department of Agriculture-National Institute of Food and Agriculture (USDA-NIFA) through the National Robotics Initiative (NRI). The government has certain rights in the invention.

FIELD OF THE INVENTION

The invention generally relates to robotic produce harvesting and, more particularly, end effectors and supporting systems for robotically harvesting apples and other produce while preferably maintaining harvest quality sufficient for fresh market sales.

BACKGROUND

In the U.S. Pacific Northwest, a large, seasonal labor-force is required for the production of tree fruit crops like fresh market apples, cherries, and pears. The most time and labor-intensive task in fruit crop production is harvesting. In Washington State alone the apple and pear harvest requires the employment of approximately 30,000 additional workers with an estimated harvest cost of $1,100 to $2,100 USD per acre per year. To reduce harvesting costs and dependence on seasonal labor, researchers have developed shake-and-catch systems for the mass harvesting of fruits such as berries, cherries, and citrus. These techniques, which apply vibration to the trunk or branch of the tree in order to separate the fruit, are typically used to harvest fruit destined for the processing market where there are established tolerances for fruit bruising and external defects. There have been some attempts to develop mass harvesting systems for fresh market citrus, cherries, and apples, but the systems demonstrated marginal rates of fruit detachment, were only efficient with compatible tree-training systems, or frequently harvested fruit without stems.

The use of robotics technology is another approach researchers have tried for the harvesting of tree fruit. For economic reasons related to changing labor conditions, scientists and engineers started to actively work on research and development of fruit-picking robots in the 1980s. These earlier research efforts defined the basic functional requirements of a fruit-picking robot as the following: i) locate the fruit on the tree in 3D dimensions; ii) approach and reach for the fruit; and iii) detach an undamaged fruit from the tree and deposit it in a container. In order for a fruit-picking robotic system to be commercially viable, it has to be economically feasible and provide harvesting rates (e.g. fruit/second) comparable to those obtained through manual harvesting. Additionally, the system should minimize damage to both the plant and the harvested fruit to a tolerable level. Despite numerous attempts to transfer industrial robotic technology directly to field based, biologically driven environments, the mechanization of specialty crop harvesting has achieved only limited success primarily due to inadequate accuracy, speed, and robustness.

Fruit in a single crop possess a high level of variability. For example, tree fruit vary in position, shape, size, and growing orientation. Even for the same apple cultivar, parameters such as size and stem length vary widely within a single tree. There also exists a year-to-year variability in these parameters. Fruit removal technique is usually the largest cause of fruit injury. Insufficient automated devices exist for fruit harvesting which are able to accommodate these requirements.

Because of rising labor costs, a high workplace injury rate due to ladder use, and increasing uncertainty about the availability of farm labor, the lack of mechanical harvesting is a critical problem receiving much attention from both federal agencies (e.g., United States Department of Agriculture) and state and local organizations (e.g., Washington Tree Fruit Research Commission).

The basic functional requirements of an apple picking end-effector are to approach and reach for the fruit and then detach an unblemished apple from the tree. In addition to being efficient, productive and economically feasible, it is important that the system not damage the picked fruit, adjacent fruit, or the tree. The end-effector can damage the apple by applying excessive force during picking or by employing inappropriate stem separation techniques. Some different techniques have been investigated for end-effector designs.

Bulanon and Kataoka (Bulanon & Kataoka, 2010) designed an end-effector that used a peduncle holder to apply pressure against the peduncle before removing the fruit with a lifting and twisting motion. Though this technique minimized damage to the fruit, the system was constrained in that the end-effector had to approach the apple horizontally.

Baeten et al. (Baeten, Donne, Boedrij, Beckers, & Claesen, 2008) developed a novel gripper consisting of a flexible silicon funnel that used vacuum suction to activate the gripping function. During field tests the average harvesting time was approximately nine seconds, but stem pulls occurred with approximately 30% of the harvested apples. It was also important to sequence apple selection so that adjoining apples in a cluster would not interfere with the picking process.

Zhao et al. (Zhao, Lu, Ji, Zhang, & Chen, 2011) proposed a cutting end-effector utilizing multiple sensors that demonstrated impressive fruit detachment rates during field tests. Although cutting minimizes the likelihood of stem pulls, it usually requires more complex control requirements, which can lead to higher costs.

SUMMARY

According to an aspect of the invention, solutions are provided to address one or more of the following objectives:
1. Achieve average harvesting time, which is defined as the time from fruit localization to storage in a container, of six seconds or less.
2. Replicate the kinematics and dynamics of human picking to minimize fruit damage and stem pulls.
3. Minimize the volume of the end-effector workspace in order to reduce the likelihood of collisions with adjacent fruit and branches.

4. A system not constrained to approaching the fruit from a single direction.
5. Adaptable to harvesting of multiple apple cultivars with variable, distinct geometries.
6. Lightweight, simple, low-cost, and robust to an agricultural environment.

According to an aspect of the invention, underactuated end-effectors are presented that are made for the robotic harvesting of produce, especially tree fruit such as apples. The device is optimized for speed, low complexity, suitability for a highly variable field environment, and the replication of manual hand picking so as to minimize fruit damage. In some embodiments, the end-effector produces a spherical power grasp with a normal force distribution and picking sequence replicating selected human patterns.

According to another aspect of the invention, an underactuated, tendon-driven end-effector with compliant flexure joints is provided to improve system performance in the presence of position errors as well as enhance robustness to variable fruit size, shape, and orientation. In some embodiments, the end-effector has few or no sensors (e.g., for detecting angular positions or points of contact). An exemplary end-effector incorporates open-loop control to reduce complexity and improve picking speed. Examples are presented which determine the normal forces developed during grasping of the apple. Results indicate that open-loop, feedforward control can be used to produce optimal normal force patterns.

Whereas advanced robotic hands designed to perform manipulation tasks with high dexterity are quite complex, underactuated hands are much simpler devices that can perform a human-like grasp compliant to the object without requiring independent actuation of each joint. An underactuated device is beneficial because only grasping of the fruit is needed—the end-effector does not require the capability to perform dexterous manipulation. A tendon-driven device gives a transmission system that is lightweight, relatively simple, and enables an adaptive grasp of multiple apple cultivars.

According to another aspect of the invention, a robotic system integrates a manipulator, end-effector, and machine vision system during fruit harvesting. The manipulator may be a serial link manipulator, for example. The manipulator and end-effector have a low-cost design. The sequence of picking motions used by the robot replicate the dynamics of human apple picking.

According to another aspect of the invention, a method of autonomous robotic harvesting of fruit is described which includes approaching a piece of fruit that is nearest to and reachable by a robotic end-effector, the approach being made along an azimuth angle that provides a direct approach; grasping the piece of fruit with a first set of fingers (i.e., primary fingers, described below) and, separately, grasping the stem of the piece of fruit with a second set of fingers (i.e., secondary fingers, described below); and picking and dropping the piece of fruit. The first set of fingers use, for example, a power grasp. The second set of fingers use, for example, a pinch grasp. Significantly, to reduce or eliminate bruising of the fruit and/or damaging the tree branch, it is advantageous to rotate the piece of fruit (e.g., through a pendulum motion). In some embodiments, this is performed simultaneously with retracting the robotic end-effector away from the branch to which the piece of fruit is attached. The rotation bends the fruit stem, causing shear forces, which allow the stem to break away from the tree branch without damage to the branch or the fruit.

BRIEF DESCRIPTION OF THE DRAWINGS

FIGS. 6A and 6B show, respectively, an example optimal grasp configuration with an end-effector and a grasp configuration used during manual apple picking.
FIG. 7 is the robotic end-effector of FIG. 3 with the end-effector in a closed configuration grasping an object.

DETAILED DESCRIPTION

Figure 1:
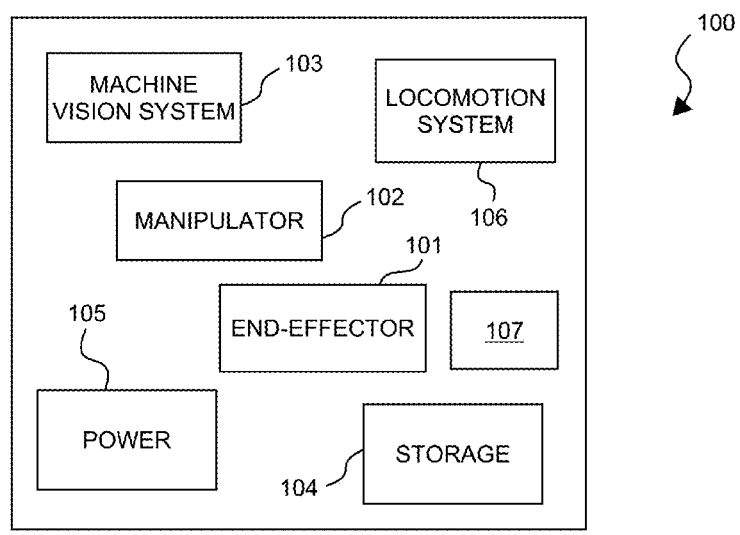
FIG. 1 is a block diagram of a robotic harvesting system.

FIG. 1 is a block diagram of a robotic harvesting system 100 for use in orchards, for example. In some embodiments, the robotic harvesting system 100 is for apple harvesting. The primary moving components include an end-effector 101, for grasping apples and removing them from the tree, and a manipulator 102, for moving the end-effector as a whole through space to reach different parts of a tree. In addition, an exemplary system 100 includes a machine vision system 103 for determining target locations of apples to which the manipulator 102 can then move the end-effector 101. The system 100 also generally includes support elements such as a storage container 104 in which harvested apples are collected, a power source 105, a locomotion system 106 for moving the entire system 100 from tree to tree, and other support elements generally shown by block 107, including, for example, a control interface, wireless antenna for remote control, and the like.

Figure 2:
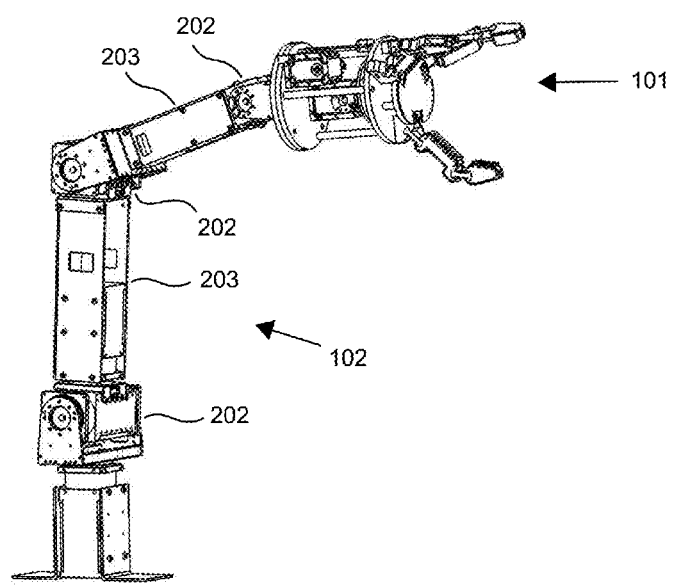
FIG. 2 is a manipulator and end-effector of a robotic harvesting system.

FIG. 2 shows an example manipulator 102 and end-effector 101. The manipulator 102 has a kinematic framework flexible enough to accommodate the crop environment. Agriculture fields and orchards present an environment that is considerably more unstructured than other areas of automation like manufacturing plants. Environmental factors include variable outdoor conditions, complex plant structures, inconsistency in product shape and size, and delicate products. With respect to apple picking, a primary source of variation with which the manipulator is configured to accommodate is the highly irregular and unstructured apple tree.

To improve obstacle avoidance (e.g., branches, tree trunks, other pieces of fruit) during harvesting, a manipulator 102 preferably has six degrees of freedom (DOF). In some exemplary embodiments, the manipulator 102 is an open chain, serial link manipulator with revolute joints. This configuration is one that advantageously offers a spherical workspace. Different embodiments may have different maximum reach. For example, a suitable reach is at least 0.5 meters (e.g., 0.5, 0.6, 0.7, 0.8, 0.9, or 1.0 meters). The manipulator 102 includes actuators 202 such as modular Dynamixel Pro actuators (Robotic Inc., Irvine, Calif.). The frame 203 can be fabricated from, for example, aluminum sheetmetal, which is lightweight, relatively inexpensive, and sufficiently durable for fruit orchard conditions.

Figure 3:
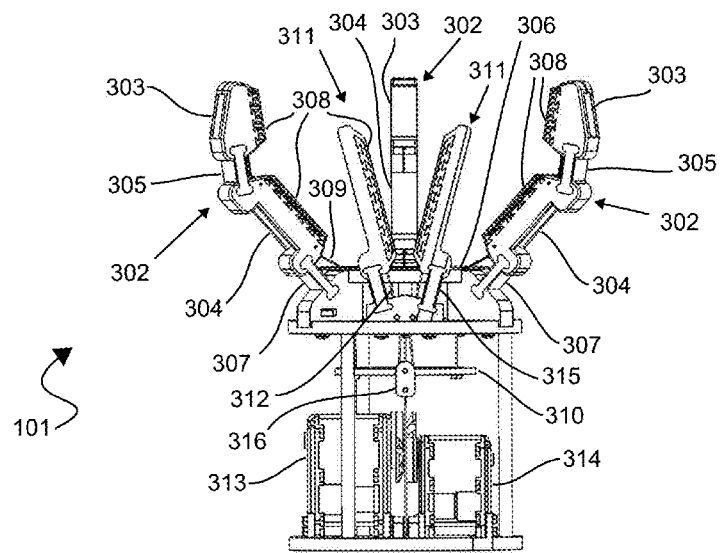
FIG. 3 is a robotic end-effector with the end-effector in an open configuration.
Figure 4:
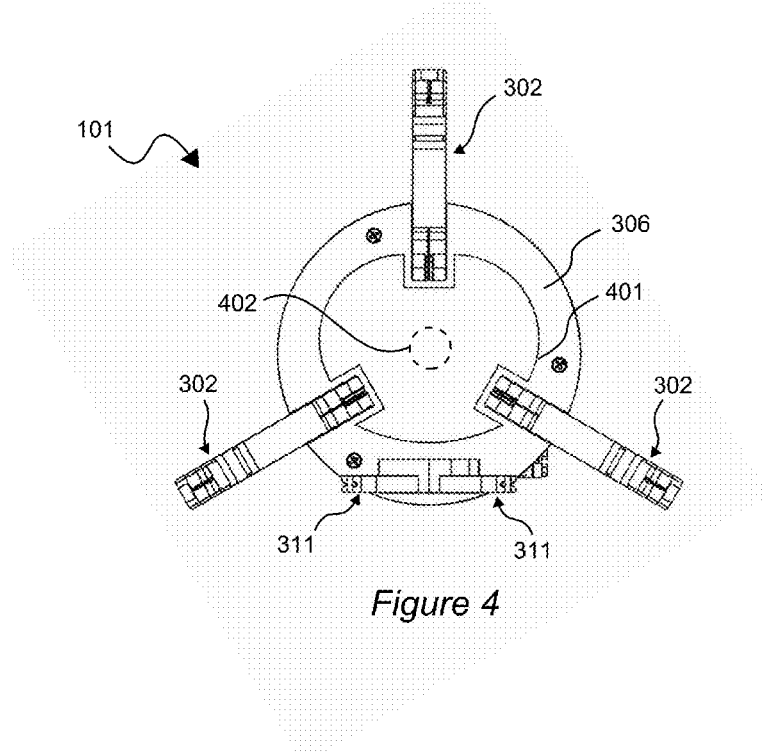
FIG. 4 is a top view of the robotic end-effector of FIG. 3.

FIGS. 3 and 4 show enlarged depictions of an end-effector 101. An end-effector 101 is a tendon-driven, underactuated gripping device. An individual end-effector 101 includes a plurality of fingers (also referred to interchangeably as "digits"). The exemplary embodiment illustrated in the figures includes three primary fingers 302 each with two links (or phalanges) connected by flexure joints. The distal link 303 connects to the proximal link 304 with a distal flexure joint 305, and the proximal link 304 additionally connects to the palm 306 with a proximal flexure joint 307. Underactuation and the passive compliance provided by the flexure joints provide several advantages in the unstructured orchard environment. For example, underactuation between the finger links 303 and 304 helps to ensure a shape-adaptive grasp of fruits with variable shapes, sizes, and orientations. The passive compliance of the flexure joints 305 and 307 also increases robustness to positioning errors. In the case of unintended collisions which are expected during harvesting, the flexure joints 305 and 307 can sustain out-of-plane deflection and large deflections without damage.

The palm 306 is defined as a base to which the fingers 302 are attached. In some embodiments, the palm serves to fix the proximal end of each primary finger 302 to a specific location with respect to the proximal ends of the other primary fingers 302. According to an exemplary configuration, the primary fingers 302 are arranged symmetrically around the palm 306. For example, for an end-effector 101 with three primary fingers 302, each primary finger is spaced apart from the other two primary fingers by 60 degrees (e.g., as measured using the center of palm 306 as a center point). Alternative embodiments may have more than three primary fingers (e.g., 4 or 5 primary fingers); however, three primary fingers are preferred for providing satisfactory performance without undue cost and complexity. The primary fingers 302 are spaced such that when grasping a sphere of average apple diameter (e.g., 80 mm), the proximal links 304 make contact with the fruit on its equator. Alternative embodiments intended for harvesting produce of other sizes (e.g., tomatoes, lemons, grapefruits, oranges, etc.) may be constructed with a similar configuration to end-effector 101 but with component sizes scaled larger or smaller based on the intended produce to be harvested. An exemplary length of a single primary finger 302 is roughly equivalent to the length of an adult male human index finger. Each link of each finger includes a padding 308 (e.g., a soft rubber pad) for contacting the piece of fruit. The paddings 308 increase friction and tangential forces between the end-effector 101 and fruit surface.

Figure 5:
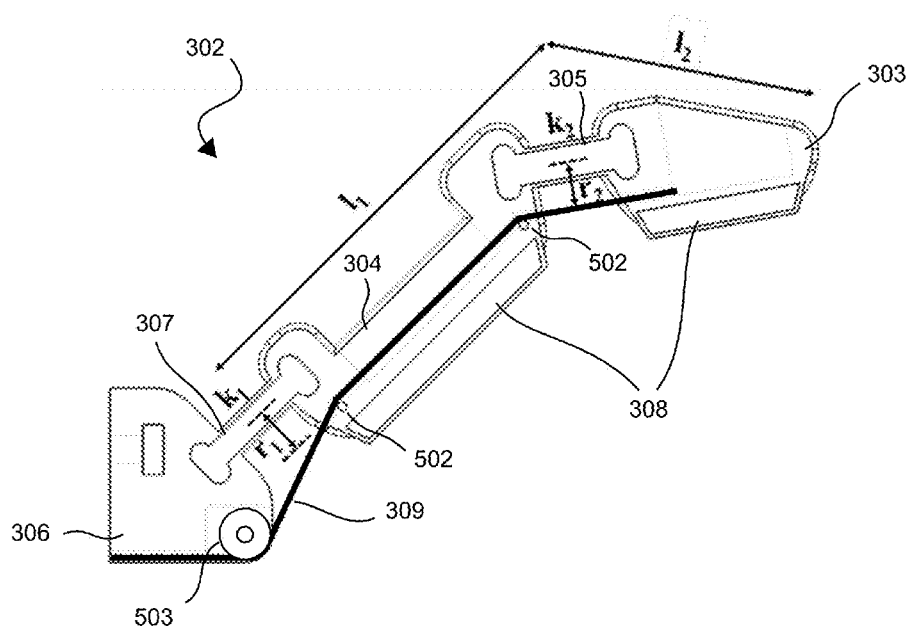
FIG. 5 is sectional view of a primary finger of the end-effector in FIG. 3.

FIG. 5 shows an enlarged sectional view of a primary finger 302 based on a bisection along the finger's plane of symmetry. The primary finger 302 is illustrated in an open configuration. In the open configuration, a non-zero angle exists between the proximal and distal links. In each of the primary fingers 302 a tendon 309 is attached (e.g., tied) at the distal tip. Leading away from the distal tip, the tendon 309 follows a hollow channel through the distal link 303 and then through the proximal link 304. The tendon 309 is routed in such a way the friction is minimalized. For example, the tendon 309 may be routed over two small dowel pins 502 in the proximal link 304 in order to reduce friction. There is a single, free-spinning pulley 503 at the base of each primary finger 302 that guides the tendon 309 to its termination point on a disc differential 310 where the tendon is secured (e.g., with a nut). The disc differential 310 is attached with a tendon to a horn of the actuator 313. In a preferred embodiment, all of the primary fingers 302 are controlled with the single actuator 313. Actuator 313 together with the disc differential 310 actuates all of the primary fingers 302 together. As an alternative, one or more additional actuators may be provided to allow independent actuation of one or a subset of the primary fingers 302. However, this generally adds undesirable cost and complexity without meaningful gains in overall functionality and performance of the end-effector 101.

Underactuation of the end-effector 101 is supported by the disc differential 310. The disc differential 310 is a variant of a seesaw mechanism and is essentially a circular disc made of, for example, a thin plastic. Each of the three tendons 309 is secured at the edge of the disc differential 310 of the differential, e.g., with a nut. With the primary fingers 302 are configured symmetrically around the palm 306, the termination points of the tendons are arranged symmetrically around the disc 310. In the event that one primary finger 302 contacts the fruit before the other primary fingers 302, the disc differential 310 rotates and enables further displacement of the two tendons of the remaining two primary fingers 302 that have not yet made contact with the piece of fruit.

In some embodiments, an end-effector 101 includes one or more (e.g., at least two) secondary fingers 311 for applying pressure against the stem during fruit detachment. The secondary fingers 311 are controlled by a separate actuator 314 from the primary fingers. In contrast to the primary fingers 302, the secondary fingers 311 preferably each have only a single link. Each secondary finger link includes a padding 308 (e.g., a soft rubber pad) for making contact with the fruit stem. In example embodiments, the secondary fingers 311 do not make contact with the fruit. A pair of secondary fingers actuate in a direction of one another but not in a direction of the palm's center. In an open position, a non-zero angle formed between the secondary fingers (30 degrees, for example, as illustrated in FIGS. 3 and 4). The secondary fingers 311 are in the open position when the manipulator 102 is positioning the end-effector 101 around a piece of fruit. The secondary fingers 311 switch to the closed position in parallel with the closing of the primary fingers 302. After the secondary fingers 311 are moved into the closed position they are in contact with and put pressure on the fruit stem. The change from the open to closed configurations of a pair of secondary fingers 311 is characterizable as a pinch grasp, not unlike the motion of a human pinch using the forefinger and thumb (particularly when the forefinger and thumb are each kept straight). A floating pulley 316 provides underactuation between the secondary fingers 311, each of which is connected to the palm 306 with a flexure joint 315. Each secondary finger 311 has a single tendon 312. The tendon 312 in each secondary finger 311 is secured at the link tips and passes over a floating pulley. The floating pulley 316 is attached with a tendon to a horn of the actuator 314. In an example embodiment, the actuator 314 is the only actuator provided for actuating all of the secondary fingers 311.

In some embodiments, the palm 306 is circular and may also be concave. A feature of the palm 306 is the provision of a padding 401 (e.g., a soft rubber insert) arranged thereon. The padding 401 serves as an allowable point of contact during a grasping task. The manipulator 102 moves the end-effector 101 to a piece of fruit (e.g., an apple) with an open configuration. Ideally, the end-effector is switched to the closed configuration after contact is made between the padding 401 of the palm 306 and the piece of fruit. This helps ensure the piece of fruit is centrally positioned among the primary fingers 302. In some embodiments, the palm 306 may include a pressure sensor 402 (shown schematically in FIG. 4) for detecting when contact is made between the padding 401 and the piece of fruit. In other embodiments, a grasp does not require contact between the palm 306 and the piece of fruit. The grasp can be performed and the detachment of the fruit completed without palm contact.

An exemplary robotic system 100 meets the following five performance criteria: i) detachment success of at least 90% (detachment success is defined as the number of successfully harvested ripe fruit per total number of localized ripe fruit present in the workspace of a manipulator 102); ii) picking time of 6 seconds or less (picking time is defined as the time required to pick and store one piece of fruit excluding the time required for ripeness determination and fruit localization); iii) damage rate to the fruit at 10% or less; iv) usable to harvest multiple apple cultivars; and v) relatively lightweight, simple, and cost effective.

An end-effector 101 accounts for the variability from one piece of fruit to the next. The configuration of the end-effector 101 takes into consideration the fruit's physical properties such as friction, firmness, and tensile strength of the stem. Performance of an end-effector 101 can be measured according to the above-identified criteria.

According to some embodiments, an end-effector 101 replicates the manipulation methods of the human hand during apple picking and addresses the constraints imposed by fruit growth habits. An optimal pattern of fruit removal with the human hand is to grasp the piece of fruit (e.g., a single apple) with the thumb and middle finger at opposite points on the equator, place the forefinger against the base of the stem, and rotate the fruit against the orientation of the stem. Compared to pulling the fruit away from the tree, this method required less force to break the stem-abscission joint and reduced the likelihood of fruit damage. Though the human grasp is a usually a fingertip grasp, an exemplary end-effector 101 provides an enveloping power grasp of the fruit. The power grasp may be characterized as being spherical. A power grasp advantageously enhances robustness to position error caused by the machine vision system 103, for example. In a fingertip grasp, contact is made between the gripping element (e.g., a human hand or robotic end-effector) and the gripped element (e.g., a piece of fruit, an apple) only at the most distal link or phalange, and often more specifically the most distal tip thereof. In contrast, a power grasp includes contact between the gripping element and the gripped element at multiple links or phalanges of each of one or more fingers (e.g., some or all of the fingers have multiple contact points with the gripped element; each link or phalange has at least one contact point).

FIG. 6A shows an example of an optimal robotic pattern of grasping an object such as an apple. The pattern illustrated is an example configuration optimized for an end-effector with three primary fingers as studied during field experiments. This pattern minimized grasping normal forces and reduced bruising compared to other tested patterns. Note that this example pattern does not include force being applied against the stem. For comparison, FIG. 6B shows a typical grasp pattern used by human laborers during manual apple picking. The harvesting end-effector is the only system component that makes physical contact with the fruit. In order to minimize damage and improve detachment success rates, some embodiments include a design based on apple growth habits and the human hand's manipulation methods during fruit picking. Based on qualitative observations, the typical pattern used by professional apple pickers is a two-finger grasp with opposing fingertips placed along the fruit's equator. To separate the fruit from the branch, the hand moves the fruit in a pendulum motion while the index finger pushes the stem, as illustrated by FIG. 6B. Using force sensors, a field experiment was performed to track and quantify normal forces during three other grasp configurations achievable by an end-effector with three opposing primary fingers. The best grasp configuration of the three tested is illustrated in FIG. 6A. None of the three grasps included the application of pressure against the stem. Results from these configurations were then compared with the manual picking pattern. Pulling while simultaneously rotating the fruit (e.g., see arrow 601 in FIG. 6A), and thereby bending the stem, produces a combined pulling and pendulum motion. This induces shear forces in the stem. In summary, experimental results show that the application of only a pulling force along the axis of the stem produces a purely tensile force in the stem and that the normal grasping forces required to detach the fruit usually exceed bruising thresholds. To break the stem-abscission joint with lower grasping forces that minimize bruising, bending the stem is generally required so as to induce shear forces.

FIG. 7 shows an end-effector 101 grasping a substantially spherical object 702 such as an apple. In some embodiments the grasp of the end-effector 101 is characterizable as a passive, adaptive grasp. An adaptive grasp describes the process whereby the fingers conform to the shape of the object being grasped. For the end-effector 101 this process is passive because shape conformity during grasping does not require additional actuating components that provide energy to the system. Dexterous manipulation of the fruit is not required in some embodiments. Embodiments without dexterous manipulation may provide a normal force distribution replicating human patterns at the proximal point of contact.

Visual sensing is an essential and primary task for an autonomous robotic harvesting system. However, vision is often considered a bottleneck for developing commercially applicable robotic harvesting systems. Variable lighting conditions, fruit clustering, and occlusion are some of the significant challenges that limit the performance of the machine vision system in an orchard environment. Prior to harvesting, the robotic system needs to identify and accurately locate the fruit. According to an example configuration for a robotic harvesting system 100 (FIG. 1), the machine vision algorithm developed by Silwal et al. (Silwal, A., Gongal, A., Karkee, M., 2014. Apple Identification in Field Environment with Over-the-Row Machine Vision System. Agricultural Engineering International: Agric Eng Int'l (CIGR Journal), 16(4): 66-75) is used by the machine vision system 103 to identify the apples. In brief, this algorithm uses Circular Hough transformation (CHT) to identify clearly visible fruit, as well as individual apples in clusters, and blob analysis (BA) to identify partially visible fruit. It has been previously tested in an orchard environment with 90% fruit identification accuracy. The physical hardware of the machine visions system 103 includes a global camera system which comprises, for example, a single CCD (Charged Couple Device) color camera (Prosilica GC1290C, Allied Vision Technologies, Exton, Pa.) mounted on top of a time-of-flight based three-dimensional (3D) camera (Camcube 3.0, PMD Technologies, Sigen, Germany). The purpose of this configuration is to acquire color images with the CCD camera to identify the apples and then obtain their 3D coordinates from the PMD camera to localize their position in space. Unlike other fruit harvesting vision systems that attach a camera to the manipulator or end-effector, the use of a single set of global cameras doesn't require computationally expensive visual servoing techniques that may constrain manipulation speeds. The machine vision system 103 is required only once, namely at the beginning of each harvest cycle to identify and localize the apples, thereby saving time and increasing the efficiency of the entire harvesting system 100.

Figure 8:
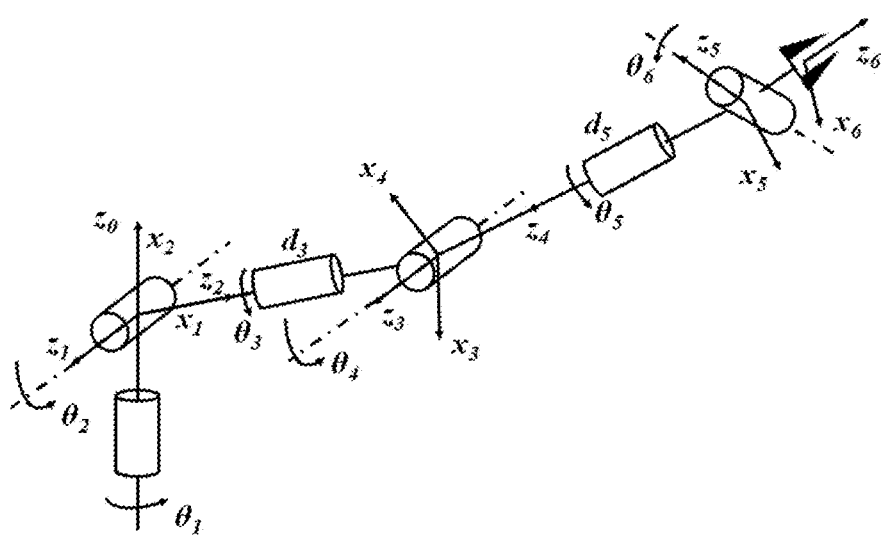
FIG. 8 shows the kinematic structure of an exemplary manipulator.

FIG. 8 and Table 1 show the kinematic structure of a manipulator 102 according to an example embodiment. The figure and table also show the kinematic structure's associated geometric parameters. The recursion formulas developed by Wang and Ravani (L. T. Wang and B. Ravani, "Recursive Computations of Kinematic and Dynamic Equations for Mechanical Manipulators," IEEE Journal of Robotics and Automation, Vols. RA-1, no. 3, pp. 124-131, 1985) are used for forward kinematics computations. Numerical solutions to the inverse kinematics problem are determined with the combined optimization method first proposed by Wang and Chen (L. T. Wang and C. C. Chen, "A Combined Optimization Method for Solving the Inverse Kinematics Problem of Mechanical Manipulators," IEEE Transactions on Robotics and Automation, vol. 7, no. 4, pp. 489-499, August 1991). This algorithm was selected because it has been shown to be computationally efficient and does not require matrix inversion. The convergence tolerance was set at 1E-6, and the joint limits of the manipulator were used as boundary constraints. The inverse kinematics algorithm has been developed in Matlab (Mathworks Inc., Natick, Mass.), compiled into a C++ shared library, and integrated with the manipulator's controller in the Microsoft Visual Studio development environment. In some embodiments, a manipulator's planned trajectory is executed using a simple, open loop look-and-move approach. A manipulator 102 is preferably configured for use with traditional orchards (e.g., with naturally shaped apple trees) as well as simple, narrow, accessible, and productive (SNAP) canopies. A SNAP canopy is a two-dimensional, planer canopy supported by a wire and posts trellis system whereby most of the branches and fruit are visible and accessible to machines.

TABLE 1

Kinematic configuration of the 6-DOF manipulator.

| Joint | Link Length a (m) | Twist Angle a (degrees) | Offset Length d (m) | Rotation Angle θ (degrees) |
|---|---|---|---|---|
| 1 | 0 | 90 | .177 | $\theta_1$ |
| 2 | 0 | 90 | 0 | $\theta_2$ |
| 3 | 0 | 90 | .270 | $\theta_3$ |
| 4 | 0 | 90 | 0 | $\theta_4$ |
| 5 | 0 | 90 | .219 | $\theta_5$ |
| 6 | .186 | 90 | 0 | $\theta_6$ |

Multiple options for the fabrication of a robotics system and end-effectors according to the invention exist and will occur to those of skill in the art based on the teachings herein. For small scale production purposes, end-effector components can be manufactured with 3D printing technology (see Example 2 below).

Figure 9:
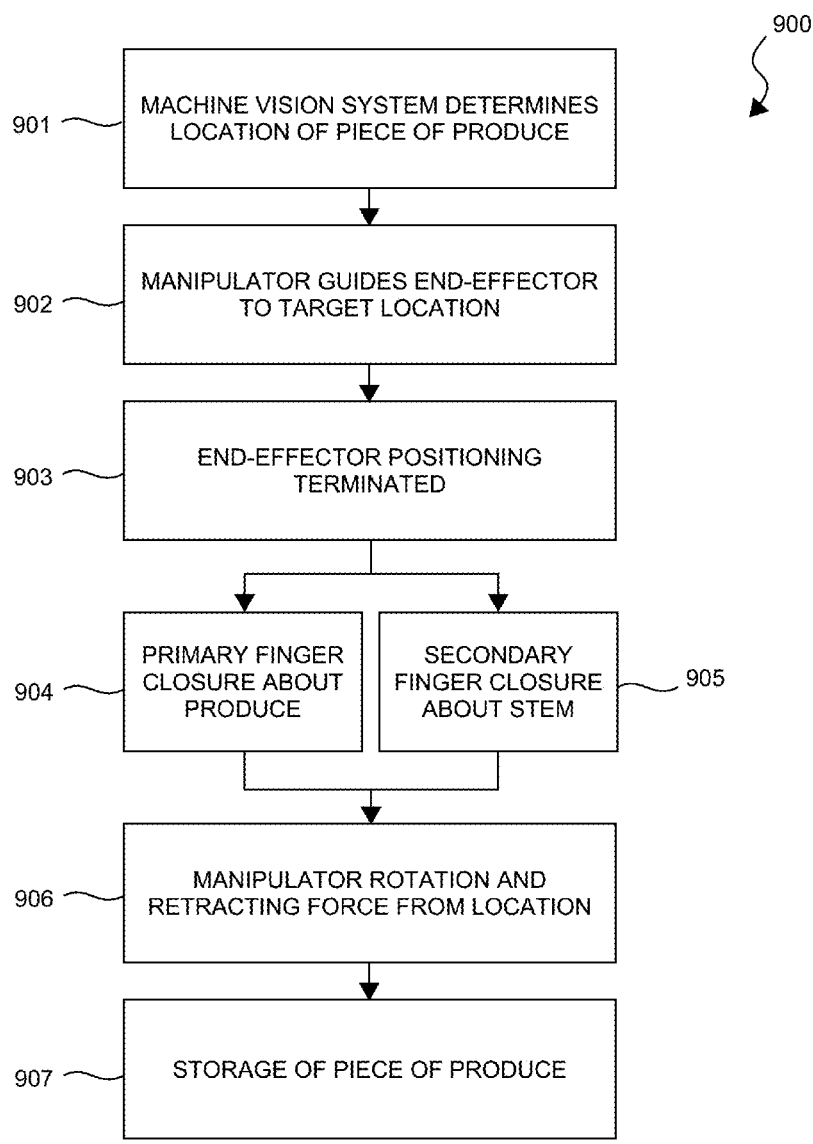
FIG. 9 is a method for harvesting produce with a robotic harvesting system.

FIG. 9 is a flowchart for a method 900 for harvesting produce (e.g., apples) with a system (e.g., system 100) and end-effector (e.g., end-effector 101) according to the invention. The method 900 is an example for picking an individual piece of produce and is repeated iteratively for picking multiple pieces of produce from a single tree.

The machine vision system first determines a location of a piece of produce to be picked (block 901). This location is supplied to the manipulator which guides the end-effector to this location (block 902). The end-effector is maintained in an open configuration while being moved into position around the piece of produce. The end-effector positioning is terminated after the produce is centrally positioned within the end-effector (block 903). This may include the palm of the end-effector making contact with the piece of produce. In some systems a pressure sensor in the palm of the end-effector determines when this contact is made. At this point the primary fingers of the end-effector close about the piece of produce (block 904) and, for a system that includes secondary fingers, these are closed to grip and apply pressure to the stem of the produce (block 905). The manipulator then pulls the end-effector away from the initial target location to remove the grasped produce from the plant (block 906). For apples, for example, this action may be a rotation and retraction from the initial produce location. The manipulator then moves the end-effector to the storage container where the piece of produce is released and stored (block 907). The procedure 900 is then repeated for another piece of produce.

Figure 10:
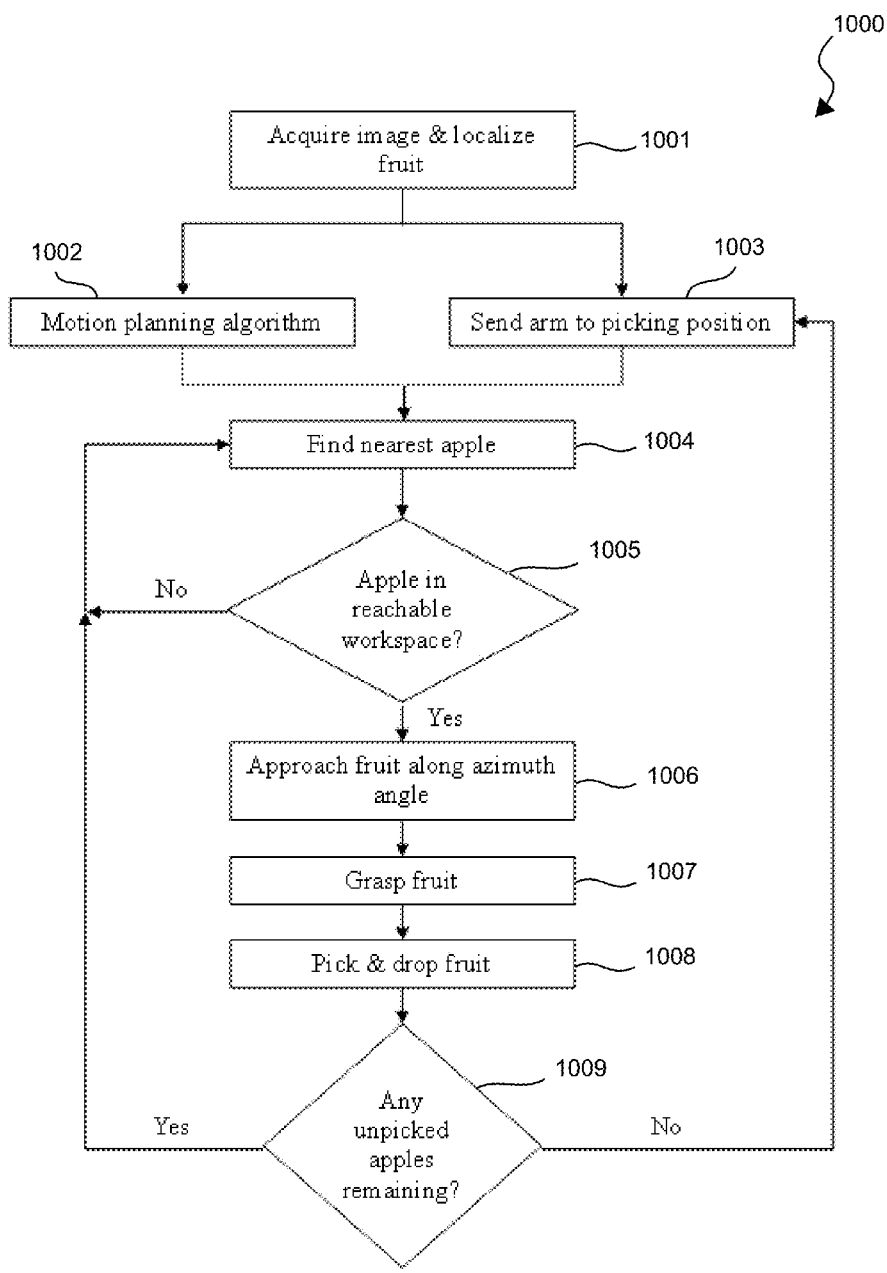
FIG. 10 is a process for harvesting from a tree with a robotic harvesting system.

FIG. 10 shows a flow diagram that is an example process 1000 for harvesting/picking a single tree in an orchard with an end-effector 101. The end-effector balances optimal picking dynamics with simplicity and reduced cost. After the machine vision system 103 localizes the position of every apple within its field of view (block 1001), the manipulator 102 guides the end-effector to an approach point a fixed distance (e.g., 10 cm) away from the nearest fruit (block 1003) in conjunction with a motion planning algorithm (block 1002). When multiple apples are in close proximity (e.g., in a cluster), the system 103 directs the end-effector to the closest remaining apple first (block 1004). A decision is made whether the apple is in a reachable workspace (block 1005). If not, then the system finds the next nearest apple. If reachable, then, following a specific azimuth angle, the end-effector 101 makes a horizontal approach along a direct path to the fruit's position (block 1006). The azimuth angle is the angle that the manipulator must rotate horizontally for the end-effector to approach the fruit along a straight line.

So, for a fruit located directly in front of the manipulator the azimuth angle is zero. When the end-effector reaches the predetermined fruit position, the primary fingers and secondary fingers simultaneously close around the fruit and stem, respectively (block 1007). After a pause (e.g., approximately one second), the end-effector is then rotated through a predetermined angle (e.g., 30 degrees, counterclockwise) and retracted along the same approach path to a fixed distance (e.g., 13 cm) away from the tree. The end-effector is then opened and the fruit is dropped into a storage container (block 1008). The manipulator then moves the end-effector to the next fruit approach point and repeats the picking process until all fruit are removed from the tree (decision block 1009).

Example 1

To reduce design complexity and enhance speed of harvesting, an example end-effector is provided which has no pressure sensors and utilizes open-loop, feedforward control. An environmental model is provided for characterizing the actuation torque required to produce the desired link normal forces. Each end-effector finger is a single-acting cable-driven system with two links and two flexure joints. The flexures are modeled as simple pin joints with rotational stiffness. For this example, which does not use sensors to detect angular positions or points of contact, modeling the flexures as pin joints with torsion springs is sufficient. However, if desired, a more accurate model of flexure bending is given Odhner and Dollar (L. U. Odhner and A. M. Dollar, "The Smooth Curvature Model: An Efficient Representation of Euler-Bernoulli Flexures as Robot Joints," IEEE Transactions on Robotics, vol. 28, no. 4, pp. 761-772, 2012) and can be used to estimate beam deflection. Rotation of the proximal and distal links is coupled until the proximal link makes contact with the object at which point the distal link will continue to independently rotate until the system is constrained. For this cable-driven finger the kinematics of the links are coupled and may be expressed as $$r_a \Delta \theta_a = J_a \Delta \theta \quad (1)$$

where $r_a$ is the radius of the actuator pulley, $\Delta \theta_a$ is the angular displacement of the actuator pulley, $\Delta \theta$ represents the configuration change of the links, and $J_a = (r_1 \ r_2)$ is the actuator Jacobian of the finger. The pulley radii are represented by $r_1$ and $r_2$. The quasi-static equation of equilibrium, which can be found with analytical mechanics and the principle of virtual work, is $$K \Delta \theta + J_c^T f_e + J_a^T f_a = 0 \quad (2)$$

where $$K = \begin{pmatrix} K_1 & 0 \\ 0 & K_2 \end{pmatrix}$$

represents the joint stiffness of the flexures, $J_c \in \mathbb{R}^{2 \times 2}$ is the contact Jacobian that maps between contact forces acting on the finger and the joint torques, $$f_e = \begin{pmatrix} f_1 \\ f_2 \end{pmatrix}$$

represents the normal contact force on the proximal and distal links, and $f_a$ is the actuator force. For this two-link mechanism the contact Jacobian $J_c$ is $$J_c = \begin{pmatrix} b_1 & 0 \\ b_2 + l_1 \cos \theta_2 & b_2 \end{pmatrix} \quad (3)$$

where $b_1$ is the proximal force location, $b_2$ is the distal force location, and $l_1$ is the proximal link length. The normal forces can then be found by $$f_e = J_c^{-T}(-K \Delta \theta - J_a^T f_a) \quad (4)$$

In most grasps the proximal normal force will be located on or about the fruit's equator.

Figure 11:
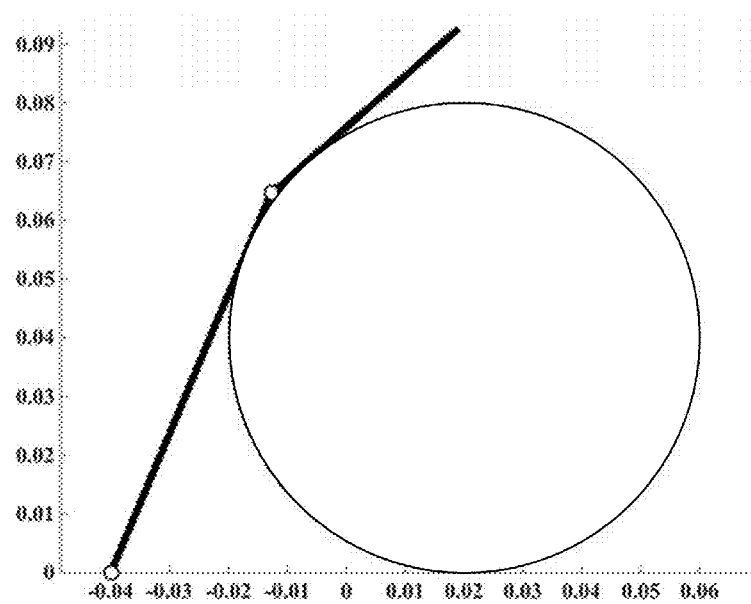
FIG. 11 shows a simulated example grasp configuration from a Matlab solver used to determine angles of link rotation and points of normal contact for various fruit positions.
Figure 12:
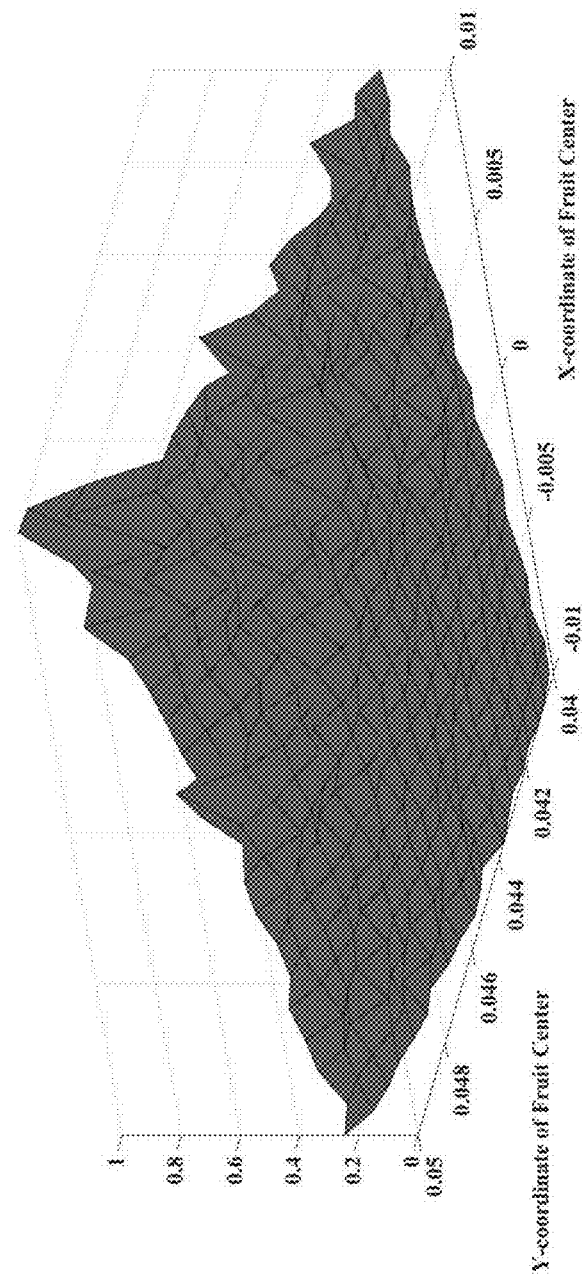
FIG. 12 shows the normalized proximal force that develops at static-equilibrium for a single finger. The x-y coordinate represents the position of the center of a circle with a radius of 40 mm.

The actuation force that produces the normal forces of human picking patterns is determined. In reality, this is a complicated process because the normal forces are highly dependent upon the final kinematic configuration of the underactuated finger. During harvesting operations position errors and variation in fruit shape and size will lead to numerous end-effector grasp configurations. Likewise, in some configurations negative normal forces may develop, which indicates loss of contact of the respective link. The actuation force input provided with open-loop control should ensure that in all possible configurations the final grasp does not damage the fruit. A Matlab simulation (Mathworks Inc., Natick, Mass.) was conducted to examine the effect of position error on the proximal normal force. The center of a circle with diameter of 80 mm was placed at different positions in the x-y plane having an error ranging from −10 to +10 mm in the x-direction and 0 to 10 mm in the y-direction. The grid included a total of 400 different fruit position points. At each point it was assumed that the fruit was constrained by the stein/branch system. The simulation used a solver to estimate the configuration where the finger links were tangent to the circle and then determined the change in link positions $\Delta \theta$ and the points of contact $b_1$ and $b_2$ assuming a single point of contact on each link. An example of an equilibrium grasp configuration calculated by the solver is shown in FIG. 11. The resulting proximal normal force was then determined with eqn. (4). Tangential forces due to friction were not considered in this example. The presence of tangential forces should increase the pullout force required to remove the fruit from the end-effector's grasp. The results of the simulation are shown in FIG. 12. The force data, which is scaled with unity-based normalization, shows that for a constant actuation force the proximal normal force is greater for increasing $\Delta \theta_1$. As shown in FIG. 10, the x-position of the finger base is located at −0.04 m. For increasing values of x the fruit moves away from the finger base and the proximal link must rotate further in order to contact the fruit. By superimposing force data from two planar fingers in an opposed grasp, it is possible to create vector fields for the total resultant force on an object. By superimposing the data from each of the three fingers the greatest resultant force can be expected near the center of the end-effector at a small distance away from the palm.

Example 2

Figure 13:
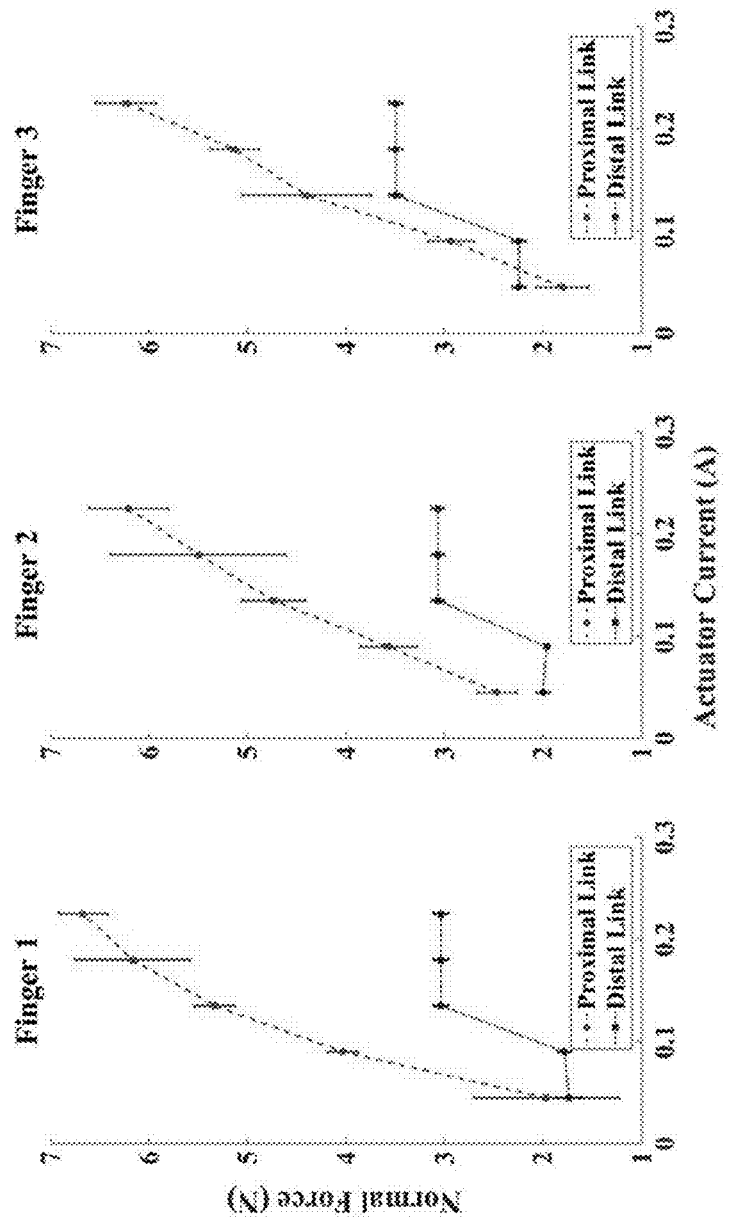
FIG. 13 shows proximal and distal normal forces compared at five different actuator loads for each finger. The data points represent the mean values of three different iterations and the error bars present standard deviation.
Figure 14:
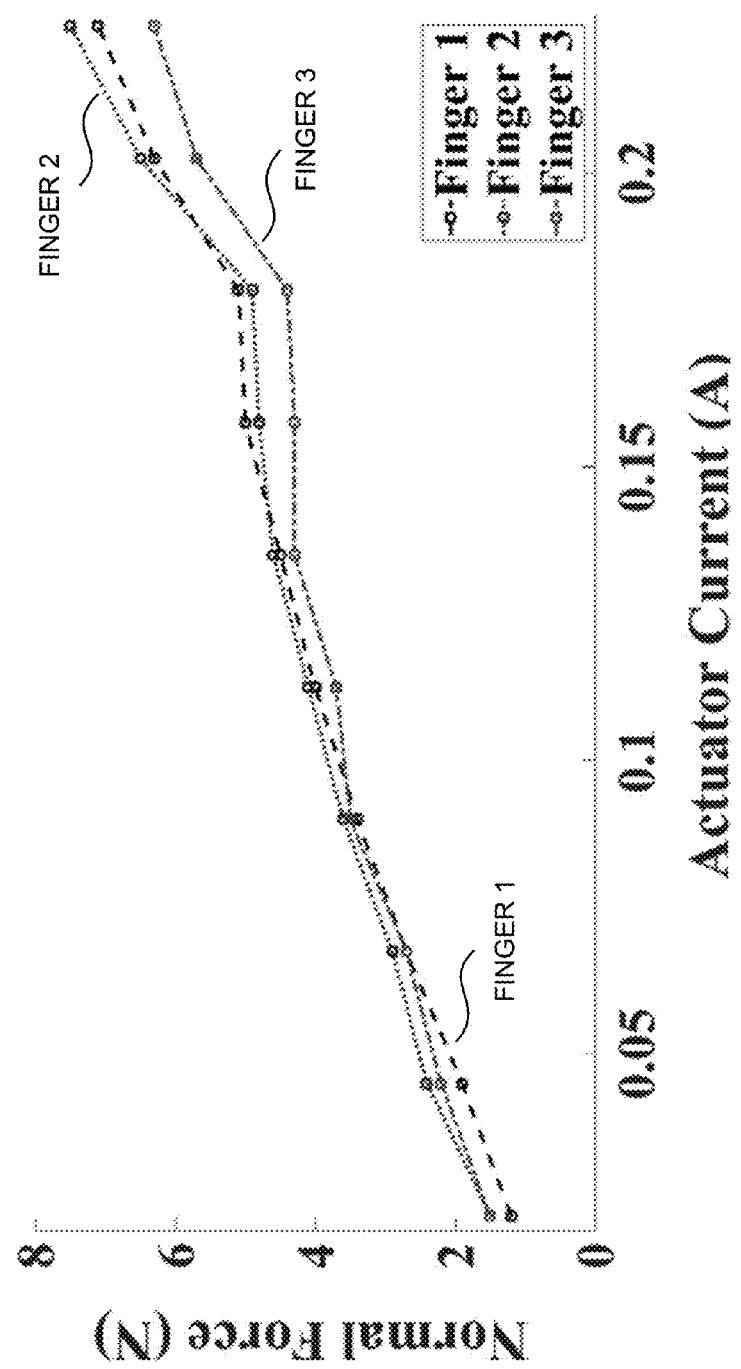
FIG. 14 shows the proximal link normal forces that develop during a power grasp of a sphere with a diameter of 80 mm. The normal forces are plotted versus the actuator load.

An example end-effector was used to characterize the relationship between actuation force and normal contact forces. Normal forces were measured during a grasp of a plastic sphere with radius of 40 mm. The sphere was located symmetrically with respect to the end-effector, meaning the centerline of the end-effector was coincident with the center of the sphere resting on the palm. Three piezoresistive force sensors (Tekscan Inc., Boston, Mass.) were attached to the contact locations on the proximal links. To complete a power grasp the end-effector's actuator, which is nonbackdriveable, was operated in torque mode and driven to its stall point. The normal force was then measured at static equilibrium. This measurement was repeated for increasing actuator loads. The experimental set-up corresponds with the configuration illustrated in FIG. 7. The same test was repeated for the distal normal forces. The results for the normal force measurements at five different actuator loads are shown in FIG. 13. As expected, for increasing tendon tension the proximal normal force is significantly higher than the distal force. While the change in proximal force is relatively linear for increasing tendon tension, the change in distal force is highly irregular and shows sharp jumps interspersed with horizontal slopes. The proximal links remain static once contact with the surface is made. The distal links, however, often adjusted their equilibrium configurations at new actuator loads. FIG. 14 shows a comparison of the proximal normal forces measured for the three fingers simultaneously at ten different actuator loads. The results present the mean values from six different iterations. For this particular grasp approximately 10% of the actuator's maximum torque value was required to produce proximal normal forces representative of those developed during manual picking of apples, which is approximately 7 N. Based on the simulation results presented in FIG. 12, the contact forces developed with this actuation torque for asymmetric grasp configurations should remain below the 11 N force threshold that caused bruising during field tests of hand-picking patterns. Though the normal force distribution was similar for each of the fingers, the grasp was not force-isotropic as would be expected for a symmetric grasp. Because normal forces are highly configuration dependent, slight variations in the sensor placement can significantly impact the final results. Also, when increasing tendon tension the point of proximal contact sometimes slightly adjusted. The change in position of normal contact relative to the sensor may be a source of some of the variance between the proximal force values.

The components of the end-effector in Example 2 were fabricated from solid models by a Replicator 2X printer (MakerBot Industries, New York). Additive manufacturing minimizes the fasteners required for assembly and lessens the total weight of the device. The fingers were printed as monolithic parts of ABS plastic. Molds for the finger pads were included in the solid parts as thin shells. A soft urethane rubber (Vytaflex 30, Smooth-On, Inc.) was poured into both the finger pad cavities and the palm. After the elastomers cured, the shells of the finger pad molds were cut away. Dovetail joints included on the fingers and palm hold the rubber pads in place. The flexures for the primary and secondary fingers' joints were printed with flexible filament (Ninjaflex, Fenner Drives, Inc.) and inserted directly into cavities in the links. Multiple high-strength low-friction filaments will occur to those of skill in the art for use as the tendons. As an inexpensive option, high strength fishing line (e.g., 100-lb) was used in the Example. The actuator pulleys, floating pulley, and differential were also printed parts. The actuators selected for the primary and secondary fingers are the Dynamixel MX-64AR (Robotis Inc., Irvine, Calif.) and MX-28AR, respectively. It is advantageous to employ a servos providing the capability of position, speed, and torque-based commands. Dynamixel servos include a 4,096 step absolute encoder after gear reduction and integrate a DC motor, reduction gearhead, PID controller, motor driver, and data network. These particular models have stall torques of 7.3 N-m (MX-64AR) and 2.5 N-m (MX-28AR). Because the operating voltage of the end-effector servos is 12 VDC, it used a separate power supply than the manipulator, which operates at 24 VDC. The servos are controlled in the Microsoft Visual Studio C++ development environment using the software development kit (SDK) provided by the manufacturer.

The mass of the assembled end-effector in Example 2 was 0.4 kg. Based on the average mass of the apples harvested, the total payload of the end-effector and harvested fruit is generally less than 0.7 kg. Some key geometric and physical parameters of the end-effector fingers are provided in Table 2. The orthogonal distance from the midline of the flexure to the tendon entry point is used for the equivalent pulley radii. The stiffness of the flexure joints was experimentally determined. The joints were modeled as simple torsion springs, and their rotational stiffness was measured with a load cell. The stiffness ratio $k_2/k_1$ of two between the joints plays an influential role in the nature of the coupled motion between the links. The arrangement of the fingers is designed to provide a spherical power grasp fully encompassing the fruit. In this grasping sequence the proximal link makes contact with the object first before the distal link flexes to cage the fruit. In order to ensure this two-phased motion, the distal flexure joint is stiffer than the proximal flexure joint. Individual features or multiple features from the Example 2 end-effector may be incorporated into various alternative embodiments in the practice of the invention. This Example's end-effector is illustrative only and is not necessarily intended to be limiting.

TABLE 2

Physical and geometric parameters of the end-effector of Example 2.

| Link | Length l (m) | Joint Stiffness k (N-m/rad) | Pulley Radius r (m) | Resting Angle θ (°) |
| --- | --- | --- | --- | --- |
| 1 | 0.07 | 0.055 | 0.00956 | 45 |
| 2 | 0.042 | 0.111 | 0.00716 | 35 |

While the descriptions herein have largely referred to the harvest of fruit and especially apples, the descriptions presented are of non-limiting examples. Embodiments of the invention may be used for harvesting any of a variety of types of produce, be it vegetables or fruit. Exemplary end-effectors according to the teachings herein are especially well suited for substantially spherical produce such as oranges and grapefruit. Pears, lemons, limes, and other fruit or vegetables may also be harvested with variations of the example embodiments disclosed herein.

While exemplary embodiments of the present invention have been disclosed herein, one skilled in the art will recognize that various changes and modifications may be made without departing from the scope of the invention as defined by the following claims.

Symbols $l_1, l_2$ Length of proximal and distal links
$k_1, k_2$ Stiffness of proximal and distal flexures
K Stiffness matrix
$r_1, r_2$ Equivalent pulley radii of proximal and distal joints
$r_a$ Actuator pulley radius
$\Delta\theta_a$ Angular displacement of the actuator pulley Δθ Configuration change of the links
$J_a$ Actuator Jacobian matrix of the finger
$f_e$ Vector of normal contact forces
$J_c$ Contact Jacobian matrix that maps between link contact forces and joint torques
$b_1$, $b_2$ Location of proximal and distal normal forces

We claim:

1. A robotic produce harvesting system, comprising:
   an end-effector comprising
      a palm; and
      at least three primary fingers which are tendon-driven, wherein said end-effector is underactuated, and wherein the robotic end-effector is configured to grasp a piece of produce to be harvested with a power grasp;
   a manipulator for positioning the end-effector in three-dimensional space; and
   a machine vision system for providing a location of the piece of produce to be harvested.

2. The system of claim 1, wherein planned trajectories of the manipulator are executed using a look-and-move approach.

3. The system of claim 1, wherein said end-effector has a passive, adaptive grasp.

4. The system of claim 1, wherein the end-effector further comprises a single actuator and a disc differential for simultaneously actuating all of the primary fingers together.

5. The system of claim 1, wherein the end-effector utilizes open-loop, feedforward control.

6. The system of claim 1, wherein the primary fingers are arranged symmetrically about the palm.

7. A method of autonomous robotic harvesting of fruit, comprising
   approaching a piece of fruit that is nearest to and reachable by a robotic end-effector, said approach being made along an azimuth angle;
   grasping the piece of fruit with a first set of fingers; and
   picking and dropping the piece of fruit,
   wherein said approaching step includes determining, using a machine vision system, a location of the piece of fruit that is nearest to and reachable by the robotic end-effector.

* * * * *